United States Patent [19]
Harris

[11] 3,805,437
[45] Apr. 23, 1974

[54] TROLLING OR CASTING LURE

[76] Inventor: Ewell J. Harris, Sunset Mobile Homes, Rt. No. 3, Box 135 A, Adrian, Mich. 49221

[22] Filed: June 21, 1972

[21] Appl. No.: 264,722

[52] U.S. Cl............... 43/42.13, 43/42.14, 43/42.51
[51] Int. Cl............................... A01k 85/00
[58] Field of Search............. 43/42.14, 42.15, 42.18, 43/42.2, 42.51, 42.11, 42.13

[56] References Cited
UNITED STATES PATENTS

| | | | |
|---|---|---|---|
| 2,266,234 | 12/1941 | Mitchell | 43/42.13 |
| 3,500,573 | 3/1970 | Hudson | 43/42.2 |
| 3,397,478 | 7/1968 | Lowes | 43/42.2 |
| 2,708,805 | 5/1955 | Garvie | 43/42.15 |
| 3,006,104 | 10/1961 | Allen | 43/42.15 |

Primary Examiner—Robert Peshock
Assistant Examiner—Robert F. Cutting

[57] ABSTRACT

An artificial bait having a fish-attracting or luring portion that is followed by at least two artificial bait portions which appear in active pursuit of the luring portion. The luring portion can be of a flashing or of other attention-getting construction, while the bait portions preferably have a more natural character and construction. The appearance of two or more natural looking baits in pursuit of the attention-getting portion allays apprehension in the fish produced by the luring portion.

6 Claims, 4 Drawing Figures

TROLLING OR CASTING LURE

BACKGROUND OF THE INVENTION

The prior art has produced many types of attention-getting lures which may have a colorful or flashing appearance and which in either event is quite unnatural. The writer believes that these prior art lures readily attract fish, but at the same time, the unnatural appearance of these lures instinctively produce caution in the fish and a reticence towards stricking the unnatural appearing lure. The writer believes that all natural life is warned of impending danger by unnatural appearance and/or movement.

An object of the present invention is the provision of a new and improved artificial fish bait for casting and/or trolling in which a colorful and/or flashing luring section is followed by a bait section of more natural appearing construction which gives the appearance of following the luring portion.

A further object of the invention is the provision of a lure of the above described type in which a plurality of artificial bait sections appear in pursuit of the luring section.

A still further object of the present invention is the provision of a new and improved lure of the above described type in which the bait sections which are attached to the luring section revolve in opposite directions to prevent rotation of the luring section.

Further objects and advantages of the present invention will become apparent to those skilled in the art to which the invention relates from the following description of the preferred embodiments described with reference to the accompanying drawing forming a part of this specification.

DESCRIPTION OF THE PREFERRED EMBODIMENTS

Figure 1:
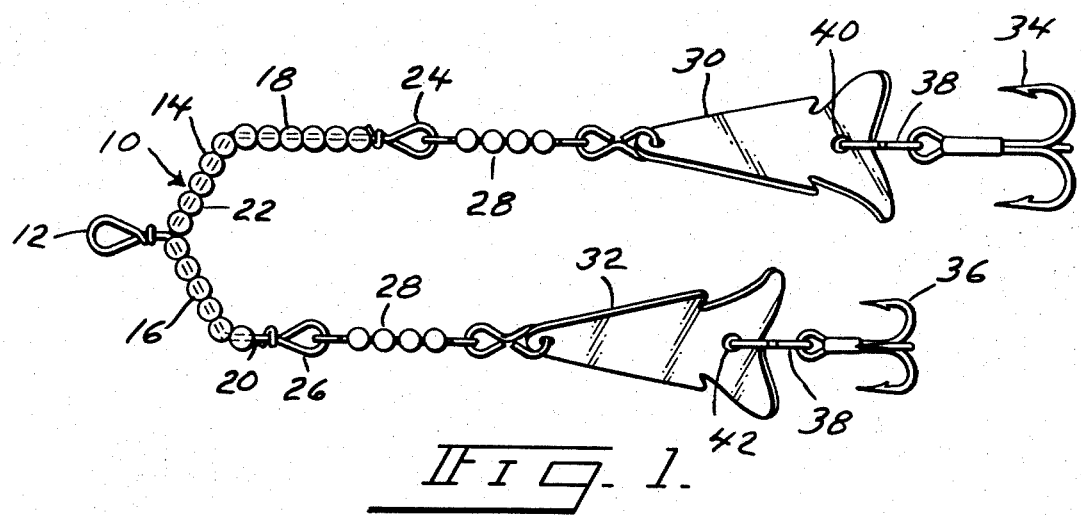
FIG. 1 is a plan view of a preferred embodiment of the present invention.
Figure 2:
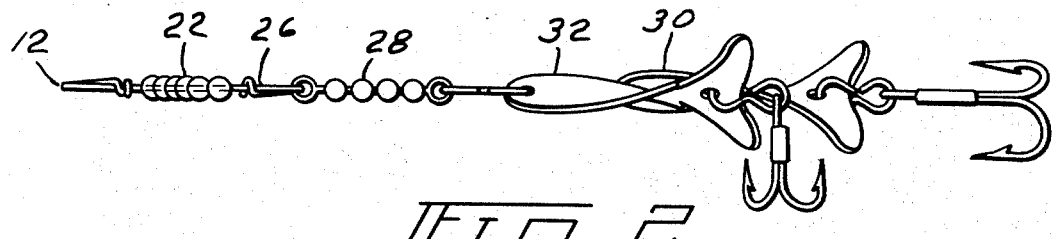
FIG. 2 is a front side view of the lure shown in FIG. 1.
Figure 3:
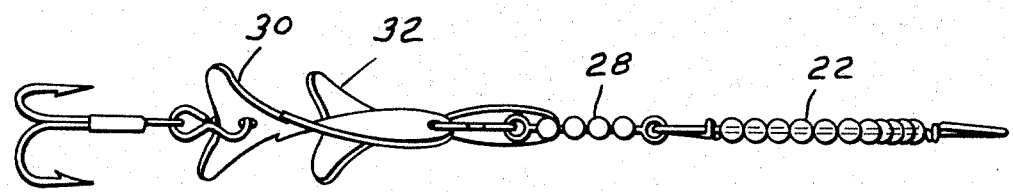
FIG. 3 is a back side view of the lure shown in FIG. 1.
Figure 4:
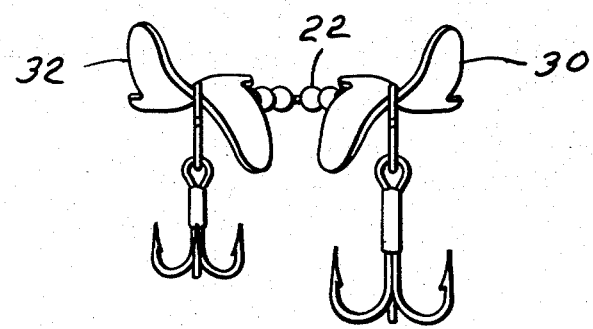
FIG. 4 is a rear view of the lure shown in FIGS. 1 through 3.

The fish lure shown in the drawings generally comprises a spreader portion 10 that is generally in the shape of a wish-bone, and which in the embodiment shown, is made of wire. The forward most portion of the spreader 10 comprises a loop of the wire 12 to which a fish line may be attached. The spreader 10 also includes oppositely extending arms 14 and 16 which preferably extend backwardly at an angle for stability reasons. The end portions of the arms 14 and 16 extend rearwardly in parallel fashion as at 18 and 20, and a plurality of beads 22 are threaded upon the arms in generally end-to-end engagement. The arms 14 and 16 are preferably of unequal length, and the ends of the wire forming the arms is looped as at 24 and 26. In the embodiment shown, the spreader portion 10 includes swivels 28 that are attached to each of the loops 24 and 26 and to which the artificial baits are attached for reasons which will become apparent.

The artificial baits 30 and 32 which are attached to the arms 14 and 16, respectively, may be similar or varied, but preferably have a more natural appearance and/or action than does the spreader portion 10. The artificial bait portions 30 and 32 will, therefore, allay any intuitive feeling of danger which may arise in the fish from the unnatural appearance of the attention-getting spreader portion, while at the same time the luring action of the lure is greater than that achieved by the artificial bait portions alone. The artificial bait portions give the appearance of following the luring portion, and it is believed that the appearance of more than one bait portion following the luring portion allays any intuitive feeling of danger that is triggered in the fish by the luring portion. In the preferred embodiment, these artificial bait portions 30 and 32 are preferably positioned with one slightly behind the other as occurs in groups of natural bait.

In the embodiment shown in the drawing, the artificial baits 30 and 32 are formed by bent pieces of metal which have the contour of minnows. Minnows which are after bait or which are feeding, sometimes turn at different angles; and because of this, some types of minnows are known as "shinners". Such types of minnows are particularly good bait, since their lighter colored underbellies become flipped in various directions to attract fish. In the present embodiment the minnow-shaped flat baits are twisted in a slight helix, so that they will rotate as they are moved through the water. One side of the flat plate is preferably of a lighter color than the other side, so that the profile of a minnow is exhibited in the direction that the flash is given.

Various types of attention-getting devices can be affixed to the spreader portion 10 to form the luring section of the lure. The brightly colored beads of the present embodiment have the appearance of eggs which are being followed and eaten by a plurality of minnows. A further feature of the present invention is that the artificial baits 30 and 32 are twisted in opposite directions, so that their rotation will not produce a corresponding rotation of the spreader portion. Rotation of the spreader would give the appearance of the mass of eggs revolving which would be unnatural. Fish hooks 34 and 36 are attached to the artificial baits 30 and 32, respectively, by means of bent wires 38 which pass through suitable openings 40 and 42 in the rear end of the artificial baits.

It will now be seen that various types of luring devices can be used as either part of, or as attached to, the spreader portion of the present invention; and that various types of artificial baits can be used as the bait portion which follows the luring portion. It is believed that a plurality of baits following a luring device, whether it is natural or unnatural in appearance, will allay the fears of the fish, and that the bait portions may have various configurations, such as for example, minnows, frogs, insects, etc.. The bait portions need not be of the same shape or configuration, but in most instances will preferably be representative of the same type of natural life in order to convey the appearance of a natural community, be it a school, swarm, etc., in pursuit of the luring section.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A fishing lure comprising: a wire spreader having a generally centrally located means for attachment to a fish line and a pair of arms on opposite sides of said attachment means with the ends of the spreader extending generally rearwardly, a pair of artificial baits with respective baits being attached to respective ones of said arms, a string of egg simulating beads on said wire spreader forwardly of each bait and cooperating with said artificial baits to give the appearance of said baits following and in position to devour said string of egg simulating beads, and a pair of fish hooks respective ones of which are attached to respective artificial baits.

2. The fishing lure of claim 1 in which said spreader causes one artificial bait to be positioned rearwardly of the other when said lure is pulled through water.

3. The fishing lure of claim 1 in which said artificial baits are shaped to give the appearance of a living animal in pursuit of said luring means.

4. The fishing lure of claim 1 including a pair of swivels respective ones of which are interpositioned between respective artificial baits and said luring means so that movement of said baits is not transmitted to said luring means.

5. A fishing lure comprising: a wire spreader having generally centrally located means for attachment to a fish line and a pair of arms on opposite sides of said attachment means with the ends of the spreader extending generally rearwardly, a pair of artificial baits with respective baits being attached to respective ones of said arms, said artificial baits having generally the contour of a minnow with the tails of respective minnows being twisted in opposite rotational directions, swivel means connecting said artificial baits to said wire spreader, a string of egg simulating beads on said wire spreader forwardly of each bait and cooperating with said artificial baits to give the appearance of said minnows following and in position to devour said string of egg simulating beads, and a pair of fish hooks respective ones of which are attached to respective artificial baits.

6. A fishing lure comprising: a spreader having a generally centrally located means for attachment to a fish line and a pair of laterally extending arms respective arms of which extend to opposite sides of said attachment means, imitation eggs on said laterally extending arms, a pair of natural-appearing artificial baits with respective baits being attached to respective ones of said laterally extending arms rearwardly of the outer end of said eggs to give the appearance of following said eggs, and a pair of fish hooks respective ones of which are attached to respective artificial baits.

* * * * *